United States Patent
Gomes

(10) Patent No.: US 11,569,664 B2
(45) Date of Patent: Jan. 31, 2023

(54) METHOD FOR CONNECTING A POWER TRANSFORMER TO AN ELECTRICAL GRID

(71) Applicant: Wobben Properties GmbH, Aurich (DE)

(72) Inventor: Victor Gomes, Thiers sur Theve (FR)

(73) Assignee: Wobben Properties GmbH, Aurich (DE)

(*) Notice: Subject to any disclaimer, the term of this patent is extended or adjusted under 35 U.S.C. 154(b) by 3 days.

(21) Appl. No.: 17/045,852

(22) PCT Filed: Apr. 2, 2019

(86) PCT No.: PCT/EP2019/058255
§ 371 (c)(1),
(2) Date: Oct. 7, 2020

(87) PCT Pub. No.: WO2019/197211
PCT Pub. Date: Oct. 17, 2019

(65) Prior Publication Data
US 2021/0140408 A1 May 13, 2021

(30) Foreign Application Priority Data
Apr. 9, 2018 (EP) .................................. 18166355

(51) Int. Cl.
*H02J 1/00* (2006.01)
*H02J 3/38* (2006.01)
(Continued)

(52) U.S. Cl.
CPC ............... *H02J 3/42* (2013.01); *F03D 9/255* (2017.02); *H02J 3/388* (2020.01); *H02J 3/40* (2013.01);
(Continued)

(58) Field of Classification Search
CPC ........ F03D 9/255; F03D 7/0284; H02J 3/388; H02J 3/40; H02J 7/0068; H02J 3/381;
(Continued)

(56) References Cited

U.S. PATENT DOCUMENTS 10,566,799 B2  2/2020  Beekmann et al.
2012/0139344 A1  6/2012  Langel
(Continued)

FOREIGN PATENT DOCUMENTS

EP  2570661 A2  3/2013
WO  2012/163398 A1  12/2012
(Continued)

*Primary Examiner* — Richard Tan
(74) *Attorney, Agent, or Firm* — Seed IP Law Group LLP

(57) ABSTRACT

A method for connecting a power transformer, located between an inverter of a wind turbine and an electrical grid, to the electrical grid; the method comprises the steps gradually increasing a voltage at a primary side of the transformer from a low starting voltage to a target voltage equal or close to a nominal voltage of the transformer, by means of the inverter of the wind turbine or by means of an auxiliary inverter, thereby increasing the voltage at a secondary side of the transformer, wherein the gradually increasing of the voltage uses energy of an internal energy storage device, connecting the secondary side of the transformer to the electrical grid after predefined target conditions have been reached.

19 Claims, 3 Drawing Sheets

(51) Int. Cl.
- *H02J 3/42* (2006.01)
- *F03D 9/25* (2016.01)
- *H02J 3/40* (2006.01)
- *H02J 7/00* (2006.01)
- *H02K 7/18* (2006.01)

(52) U.S. Cl.
CPC ............ *H02J 7/0068* (2013.01); *H02K 7/183* (2013.01); *F05B 2220/706* (2013.01); *H02J 3/381* (2013.01); *H02J 2300/28* (2020.01)

(58) Field of Classification Search
CPC ........ H02J 2300/28; H02J 3/42; H02K 7/183; F05B 2220/706; Y02E 10/72; Y02E 10/76
USPC .......................................................... 307/52
See application file for complete search history.

(56) References Cited

U.S. PATENT DOCUMENTS

2012/0287683 A1* 11/2012 Routimo ................... H02J 3/38
                                                                                                    363/40
2019/0036343 A1* 1/2019 Nelson ................. H02J 3/1892

FOREIGN PATENT DOCUMENTS

| WO | 2016/146403 A1 | 9/2016 |
| WO | 2017/135937 A1 | 8/2017 |
| WO | 2017/167784 A1 | 10/2017 |

\* cited by examiner

METHOD FOR CONNECTING A POWER TRANSFORMER TO AN ELECTRICAL GRID

BACKGROUND

Technical Field

The present invention is directed to a method for connecting a power transformer located between an inverter of a wind turbine and an electrical grid to the electrical grid. The invention is also directed to such transformer, and the invention is also directed to a wind power installation comprising such power transformer or being connected with such power transformer.

Description of the Related Art

Wind turbines are generally connected by means of a power transformer to an electrical grid. Such power transformer transforms voltage from a primary side to which the wind turbine is connected, to a secondary side to which the electrical grid is connected. The power transformer can also be simply named as a transformer.

When connecting the electrical grid to the transformer it is often a problem that an inrush current occurs. Such inrush current is the result of the difference between the magnetic state of the transformer and the magnetic state imposed by the electrical grid at the moment of the connection.

It is a particular problem that such magnetic state of the transformer at the beginning of said connection is unknown. According to that connection, i.e., applying randomly a voltage of the electrical grid to the transformer, leads most of the time to a situation where the present magnetic state of the transformer at that moment doesn't match with the magnetic state imposed by the electrical grid. This change leads to said inrush current. Such inrush currents can be at least that large, that disturbances in the connected electrical grid may result.

In order to avoid such inrush currents there is a method known which precisely monitors any disconnection of the transformer such, that the magnetic properties after such disconnection are known. Based on that, the wind turbine can be connected in such way to the transformer that said connection matches these known magnetic state. However, such method is quite complicated and also needs such device for monitoring such disconnection. It also makes any starting process difficult as such starting needs a precise triggering.

The European patent EP 2 570 661 B1 also provides a solution to start such transformer. According to the solution provided in that document there is a particular charging device provided, which is connected to the transformer and is particularly designed to start the transformer such, that inrush currents do not appear or are at least small. However, such solution makes said charging device necessary and thus increases the costs of such system. Such solution has also the disadvantage that it does not provide a black start capability, at least not in a cost efficient manner.

The European Patent Office has cited the following prior art documents in the priority application to the present PCT application: US 2012/139344 A1, WO 2017/167784 A1, WO 2017/135937 A1, WO 2012/163398 A1 and WO 2016/146403 A1.

BRIEF SUMMARY

Provided are techniques for connecting a wind turbine via a transformer to an electrical grid avoiding inrush currents or keeping such inrush currents small in a way that is as cost efficient as possible.

Provided is a method for connecting a power transformer, located between an inverter of a wind turbine and an electrical grid, to the electrical grid; the method comprises the steps:

gradually increasing a voltage at the primary side of the transformer
from a low starting voltage to a target voltage equal or close to a nominal voltage of the transformer,
by means of the inverter of the wind turbine or by means of an auxiliary inverter,
thereby increasing the voltage at a secondary side of the transformer,
wherein the gradually increasing of the voltage uses energy of an internal energy storage device,
connecting the secondary side of the transformer to the electrical grid after predefined target conditions have been reached.

It is thus provided to gradually increase a voltage at the primary side of the transformer. Accordingly, the voltage is increased from a low starting voltage to a target voltage. Said target voltage is equal or at least close to a nominal voltage of the transformer. Thus, the voltage is increased up to the nominal voltage. However, the nominal voltage does not necessarily need to be reached by 100%. A smaller value such as 90% or 95% can also be sufficient. The starting voltage could be 0. But it could also have a small value such as a value up to 5% or up to 10% of the corresponding nominal value of the voltage explained above. This way the increase starts with a small value and thus avoids to overload the inverter in terms of current provision.

Said increase is done by an inverter which is part of the wind turbine. In particular, the wind turbine comprises at least one inverter which is used to feed electrical power generated by the wind turbine into the electrical grid. Thus the same inverter, i.e., the main inverter or a main inverter of several main inverters of the wind turbine is also used to provide said increase of the voltage. This way a cost efficient solution is provided, as an additional device is avoided.

However, there could also be used an auxiliary inverter which is particularly designed to perform such increase of the voltage. Such auxiliary inverter may however also be used to feed electrical power into the electrical grid once the wind turbine is completely connected to the electrical grid and driven by the wind.

An advantageous design is to have a turbine comprising a plurality of inverters, all designed and prepared to feed electrical power into the electrical grid. All these inverters can be connected in parallel with respect to their output terminal. Accordingly, these inverters are connected such that their currents are adding up to each other to form a resulting output current of the wind turbine. One of these inverters however can be designed as an auxiliary inverter which is particularly designed to be able to provide said increase of the voltage. Accordingly, even though using an auxiliary inverter no additional device is necessary. It is only necessary to have at least one of the inverters being adapted to perform said increase of the voltage.

Said increasing of the voltage uses energy of an internal energy storage device. In particular, this uses an internal battery. Such storage device, in particular such battery, can be part of the inverter and/or part of the wind turbine.

By providing such internal energy storage device the method is able to even perform a so called black start at least a start when part of the electrical grid is not operating, i.e., that part to which said transformer is connected and into which the wind turbine is supposed to feed in electrical power.

Accordingly, the method can start the transformer by increasing the voltage and once said voltage has been increased the secondary side of the transformer can be connected to the electrical grid. In order to make that it is also suggested to first make sure that predefined target conditions have been reached, i.e., predefined target conditions of the electrical grid. Such predefined target conditions can be that said electrical grid is working properly and having a nominal grid voltage or at least a grid voltage close to such nominal grid voltage. In this case the electrical grid is operating properly.

However, if the electrical grid is not operating properly it also possible to connect the secondary side of the transformer to the electrical grid but to do that, predefined conditions of the electrical grid also have to be checked. In that case at least one predefined target condition is that the electrical grid is not having a grid failure such as a short circuit failure. It is also necessary to double check what kinds of consumers are connected to the electrical grid, at least to the relevant part of the electrical grid. In particular, in such case of such black start no consumers or limited consumers shall be connected. Preferably the method is also capable of controlling consumers to be connected to the electrical grid once the transformer is connected with its secondary side to the electrical grid.

Said predefined target conditions shall thus distinguish whether the grid is available or not. If the grid is available a predefined target condition may comprise if the voltage level at the output of the transformer, i.e., at the secondary side of the transformer has the level of the grid voltage or is at least having a level around the grid voltage. It may also be tested as a predefined target condition, if the frequency matches the grid frequency, or if the frequency provided by the inverter is at least around the grid frequency. It may also be checked as a predefined target condition if the signal generated by the inverter and available at the second recite of the transformer is in phase with the grid phase. However, this may also include small deviations or deviations in order to supply a reactive power.

If the grid is not available one predefined target condition may be if the voltage level is at a nominal value, or at least around such nominal value. In particular, it may be checked as a predefined target condition if the voltage level at the secondary side of the transformer is at a nominal value of the grid voltage. One predefined target condition may also be if the frequency is having a nominal value or is at least around a nominal value. In particular, such predefined target condition is whether the frequency generated by the inverter has a nominal value of the grid frequency, in particular 50 Hz or 60 Hz.

According to one embodiment, the energy storage device is pre-charged from the wind turbine during normal operation of the wind turbine. In particular, the energy storage device is not buffered from the electrical grid after a recovery of the electrical grid. This way the charging of the energy storage device is basically not affecting the electrical grid. The energy produced by the wind turbine can directly use to charge the energy storage device, in particular a battery device and accordingly any loss of energy on the lines between the wind turbine and the electrical grid, including the transformer for charging is avoided.

According to one embodiment it is suggested to charge the battery storage device during normal operation of the wind turbine when there is excess power in the electrical grid or at least no demand of power in the electrical grid, or when a demand of power in the electrical grid decreases. This way such periods of excess power or a reduced power demand can efficiently be used to charge the energy storage device. Accordingly, it was recognized that an event of starting a wind turbine and thus an event of starting the transformer is quite seldom and in particular can be less often than once a day. Accordingly, there is plenty of time to wait for a good situation in the electrical grid to take some of the energy produced by the wind turbine to charge the electrical storage device.

According to one embodiment it is suggested that the step of gradually increasing the voltage of the primary side of the transformer is performed such that an overload current of the inverter, in particular an inrush current in the transformer is avoided or reduced. To avoid completely such inrush current is an optimal feature, but the inrush current shall at least be small.

In order to avoid an inrush current or to only have a reduced inrush current or as an alternative solution it is suggested that the voltage of the primary side is increased gradually to the target voltage of a predefined rising time. Accordingly, there is a predefined rising time given and over this predefined rising time the voltage of the primary side is increased and thus the way of increasing the voltage is clearly defined. This avoids an unwanted voltage step.

In particular, the rising time is in a range of 10 ms (millisecond) to 300 s (second). In particular, it is from 100 ms to 30 s. In view of a frequency of about 50 Hz (Hertz) or 60 Hz to be generated this lowest limit of 10 ms provides a rising period of half sinus periods of the generated signal. Accordingly, the voltage rises within half periods of sinusoidal signal and that is quite quick but still provides a solution to limit the overload of the inverter in terms of current.

Said upper limit of 300 s provides for a technically quite slow rising period. Accordingly, any inrush current may even, depending on the accuracy of a corresponding measuring device, avoid an inrush current completely. However, in view of other steps needed to start the wind turbine, such as adjusting the position of the rotor blades, the azimuth position of the nacelle to mention just two examples, the time period of 300 s is not too long.

However, in particular 100 ms to 30 s is a preferred range. 100 ms allows for a starting process over 5 to 6 periods of the sinusoidal signal. 30 s is not long in view of a starting process of a wind turbine. Accordingly, such periods of 100 ms to 30 s allows a quick starting process but still is able to limit the overload of the inverter in terms of current.

For the starting voltage it is suggested to have this in a range of 0 to 70% of the nominal voltage of the transformer. It is preferably in a range of 0 to 10% of the nominal voltage of the transformer. In particular, the starting voltage is 0% of the nominal voltage of the transformer and thus 0 volt. It is preferred to have 0 voltage as a starting voltage, in order to prevent the inverter from providing too high current. However, if such starting voltage starts at a little higher value, i.e., being in the range of 0 to 10% of the nominal voltage, the inverter is able to provide the required current while also a voiding a too high overload of the inverter.

However, even though a small starting voltage is preferred in order to reduce or avoid the inrush current, the starting voltage may even be in a range of 0 to 70% of the nominal voltage of the transformer, i.e., with respect to the primary side of the transformer. It was realized that a small starting voltage is preferred in order to reduce the overload of the inverter in terms of current, but starting with a higher voltage is much easier to implement or it is to be implemented with less costs and thus the starting voltage may be a compromise of easy or cost efficient implementation on the one hand and reducing the overload of the inverter on the other hand. This is met by the range 0 to 70% which still limits the current to be provided by the inverter.

It is suggested according to one embodiment that the target voltage is in a range of 75% to 110% of the nominal voltage of the transformer and preferably the target voltage is the nominal voltage of the transformer. However, the target voltage may also be slightly different to the nominal voltage, in particular by 2 to 5% of the nominal voltage, thus being in a range of 95% to 105% of the nominal voltage.

According to these suggestions the target voltage is close to the nominal voltage and thus the method provides a solution to gradually increase the voltage to the nominal voltage bringing into a situation being able to connect to the electrical grid with no inrush or limited inrush.

According to one embodiment the wind turbine is operated in a self-sustain mode once the target voltage has been reached and at least until the secondary side of the transformer has been connected to the electrical grid. Accordingly, the voltage is increased for preparing the transformer and thus the wind turbine to be connected to the electrical grid. However, it was realized that the wind turbine or the transformer cannot always readily be connected to the electrical grid. In particular, it must first be assured that the predefined target conditions have been reached. It may take a quite long time until these predefined target conditions have been reached. In addition, or as part of the predefined target conditions being reached an operator of the electrical grid might instruct the wind turbine to defer connecting to the electrical grid.

Accordingly, the transformer shall be kept in its current situation in which it has reached the target voltage. This is according to this aspect done by operating the wind turbine in a self-sustain mode. According to this self-sustain mode the wind turbine generates electrical power from the wind and uses this in particular to keep the transformer ready having the target voltage. It also keeps the wind turbine being ready once the transformer and thus the wind turbine is connected to the electrical grid. In this case the wind turbine can readily supply electrical power to the electrical grid, as it is already operating according to the self-sustaining mode and only needs to increase the amount of power from the amount needed for the self-sustain mode to the amount to be fed into the grid. The amount fed into the grid will advantageously be the amount of power that can be produced by the wind turbine.

Preferably the wind turbine also recharges the internal energy storage device during self-sustain mode. According to this suggestion, it was realized that during self-sustain mode the wind turbine produces less power than possible and accordingly it is suggested to slightly increase this power generated from the wind such that the internal electrical storage can be recharged.

According to one embodiment the method is characterized in that if the electrical grid is in operation when connecting the secondary side of the transformer to the electrical grid, active power is readily consumed from the electrical grid or injected into the electrical grid once the secondary side of the transformer is connected to the electrical grid, and/or reactive power is readily consumed from the electrical grid or injected into the electrical grid once the secondary side of the transformer is connected to the electrical grid.

Accordingly, the wind power installation can readily support the electrical grid by supplying active power and/or reactive power once the transformer and thus the wind turbine is connected to the electrical grid. This implies that the electrical grid is in operation. Supplying power includes also positive and negative supply, i.e., injecting power or consuming power. Supplying active power and supplying reactive power shall be controlled independently from each other. This way a different task of supporting the electrical grid can be fulfilled. In particular, a voltage support can be fulfilled by supplying reactive power and a support of the frequency can be provided by supplying active power.

These features are particularly helpful in connection with the starting and thus connecting of the transformer to the electrical grid. The starting of the transformer, i.e., increasing the voltage to the target voltage, can thus interact with supporting the electrical grid. The proposed solution in particular according to this embodiment provides for starting the transformer in order to be able to readily support the electrical grid. This can be done without incurring any inrush current or at least only with a small amount of inrush current and is thus particularly well suited to support the grid as an inrush current might also result in disturbing the grid. Accordingly, if a wind turbine supports the electrical grid but induces a significant disturbance because of an inrush current, that might negatively affect the electrical grid and thus work against the support. In other words, such disturbance of an inrush current might destabilize the grid whereas it in fact needs support in order to be stabilized. The present disclosure avoids such disturbance and thus the support can be given without such disturbance.

According to one embodiment it is suggested that the wind turbine is connected to the grid without consuming or injecting any power. Accordingly, the wind turbine and thus the transformer is connected to the electrical grid and could supply, i.e., consume or inject, active power as well reactive power, but it is not doing that. According to this suggestion the wind turbine may be operated in a self-sustain mode while being connected and just waiting until it may supply active or reactive power.

According to one embodiment it is suggested, to operate the wind turbine with a rotational speed of its rotor according to the prevailing wind, in particular to operate it with nominal rotational speed, but to generate less power than could be generated according to the prevailing wind. In particular, it is only generated as much power as needed for a self-sustain mode or it is producing no power. Accordingly, the rotational speed of the rotor of the wind turbine is much higher than it would be according to the small or zero amount of power being generated. Such operational mode could be realized by pitching the rotor blades accordingly so that the rotor blades only absorb very little power from the wind. Having this high rotational speed the wind turbine can quickly change over to a situation of producing as much power as is possible according to the prevailing wind condition. Such switch-over can be done if the wind turbine is, supplying active or reactive power or supplying only a small amount of active reactive power and shall than increase its power supply.

According to one embodiment it is suggested that if the electrical grid is not in operation, the wind turbine operates the electrical grid or part of it in an island mode after connecting the transformer to the electrical grid. Accordingly, the start of the transformer and the start of the wind turbine even go this further step to start the electrical grid or at least part of the electrical grid. This is done in a way that the electrical grid or said part of it is operated in an island mode after connecting the transformer to the electrical grid. In such island mode the wind turbine provides the voltage and frequency of the electrical grid or of said part of the electrical grid. Said part of the electrical grid can also be named as a partial grid or as grid part. Accordingly, there is at least a first and second grid part.

Accordingly, at least such partial grid can be operated in an island mode and thus it can be operated as an island grid. Some consumers can be connected to the island grid, which consume approximately the amount of power the wind turbine can provide. Once such island grid is started and operating further consumers and further energy producers can be connected. It is also possible, if such partial grid is operated an island mode, i.e., as an island grid, to reconnect with other partial grids. This way an electrical grid consisting of a plurality of partial grids can be restarted after a blackout.

In order to provide such operation in an island mode and possibly restarting of an electrical grid comprising a plurality of partial grids the method provides an effective solution that even avoids problems caused by inrush currents. It was realized that such operation in an island mode is quite sensitive and thus at least the disturbance that might be caused by an inrush current is avoided and accordingly such possible source of another break down of the electrical grid or partial grid is avoided. It was also realized that such electrical grid or partial grid or grid part is particularly sensitive of having a further break down during such starting operation.

The proposed solution even provides for a possibility to start at least a small partial grid by a single wind turbine and that even avoids inrush currents and corresponding disturbances.

According to a further embodiment the method is characterized in that if the electrical grid is separated in a first and second part and after connecting the secondary side of the transformer to the electrical grid the transformer is connected to the first part, the wind turbine operates the first part in an island mode, the wind turbine synchronizes the first part of the electrical grid to the second part of the electrical grid to prepare a reconnection, and a reconnection of the first part and the second part of the electrical grid is initiated after, in particular once, the first part and second part of the electrical grid are synchronized, in order to rebuilt the electrical grid or a part of it.

Accordingly, this embodiment is one possibility to perform the above explained restarting of an electrical grid. This method can be used in case of the electrical grid or part of it having observed a blackout.

In particular, after the reconnection of the first part and second part of the electrical grid active and/or reactive power can be supplied to the electrical grid in order to support. This can be done to the first part of the electrical grid but other energy producers can supply active and/or reactive power to the second part of the electrical grid.

According to one embodiment the inverter is provided as a voltage source inverter. In case an auxiliary inverter is used, this auxiliary inverter shall be provided as a voltage source inverter. A voltage source inverter is capable of controlling the voltage level at its output and this way via the transformer it is able to control the voltage level in the supply grid or at least in said part it is connected to. Wind turbines commonly use current source inverters, which control a current which is adapted to feed active or reactive power into the electrical grid according to the phase angle of such current with respect to the phase angle of the voltage which is present in the electrical grid. In other words if the phase angle between the current fed into the electrical grid and the voltage in the electrical grid is 0 only active power is fed in.

Such current source inverter is not supporting the voltage, at least not directly, but adapts its output voltage to the voltage present in the electrical grid and thus consequently present at the primary side of the transformer. Such current source inverter cannot provide and control a voltage level of the electrical grid or a part of the electrical grid.

Accordingly, using a voltage source inverter for starting the transformer is particularly advantageous if the electrical grid or part of it is afterwards started or operated by the wind turbine. Once such voltage source inverter provides a voltage level in the electrical grid further inverters can be connected, in particular can be connected in parallel. Such further inverters do not necessarily be voltage source inverters. A voltage source inverter can be used to start a transformer and control a first voltage level of the electrical grid after connection and the current source inverters can be added to provide further power.

Provided is a wind turbine system comprising:
a wind turbine having:
an inverter for supplying electrical power generated by the wind turbine to an electrical grid; and
an internal energy storage device for storing energy to supply the inverter or an auxiliary inverter;
a power transformer located between the inverter of the wind turbine and the electrical grid, the transformer having:
a primary side for connecting to the inverter; and
a secondary side for connecting to the electrical grid,
wherein the wind turbine system, in particular the wind turbine comprises a control unit being adapted to perform the method steps
gradually increasing a voltage at the primary side of the transformer
from a low starting voltage to a target voltage equal or close to a nominal voltage of the transformer,
by means of the inverter of the wind turbine or by means of the auxiliary inverter,
thereby increasing the voltage at the secondary side of the transformer,
wherein the gradually increasing of the voltage uses energy of the internal energy storage device; and
connecting the secondary side of the transformer to the electrical grid after predefined target conditions have been reached.

According such wind turbine a system is adapted to perform a method as explained above with respect to at least one embodiment of the method for connecting a power transformer to the electrical grid. In particular, such method is implemented in the control unit, preferably by means of a computer program running on a computer of the control unit.

Preferably, the inverter and/or the auxiliary inverter is provided as a voltage source inverter. This way a system is particularly capable of controlling a voltage in the electrical grid.

Provided is a wind turbine comprising:
an inverter for supplying electrical power generated by the wind turbine to an electrical grid; and
an internal energy storage device for storing energy to supply the inverter or an auxiliary inverter, being adapted to be connected to
a power transformer located between the inverter of the wind turbine and the electrical grid, the transformer having:
a primary side for connecting to the inverter; and
a secondary side for connecting to the electrical grid, wherein the wind turbine comprises a control unit being adapted to perform the method steps
gradually increasing a voltage at the primary side of the transformer
from a low starting voltage to a target voltage equal or close to a nominal voltage of the transformer,
by means of the inverter of the wind turbine or by means of the auxiliary inverter,
thereby increasing the voltage at the secondary side of the transformer,
wherein the gradually increasing of the voltage uses energy of the internal energy storage device,
connecting the secondary side of the transformer to the electrical grid after predefined target conditions have been reached.

Such wind turbine is in particular adapted to be used in the wind turbine system explained with respect to at least embodiment. It is also preferably characterized in that the inverter and/or the auxiliary inverter is provided as a voltage source inverter. This enables the wind turbine to control the voltage in the electrical grid, which is particularly useful to start or rebuild such electrical grid or a part of it.

Such wind turbine preferably uses a method for connecting a power transformer to the electrical grid according at least one embodiment explained above with respect to such method. To perform such method the wind turbine comprises a control unit, which is adapted to perform such method. In particular, such method is implemented in the control unit, preferably by means of a computer program running on a computer of the control unit.

BRIEF DESCRIPTION OF THE SEVERAL VIEWS OF THE DRAWINGS

The invention will now be explained by way of example using at least one embodiment and the enclosed figures.

DETAILED DESCRIPTION

Figure 1:
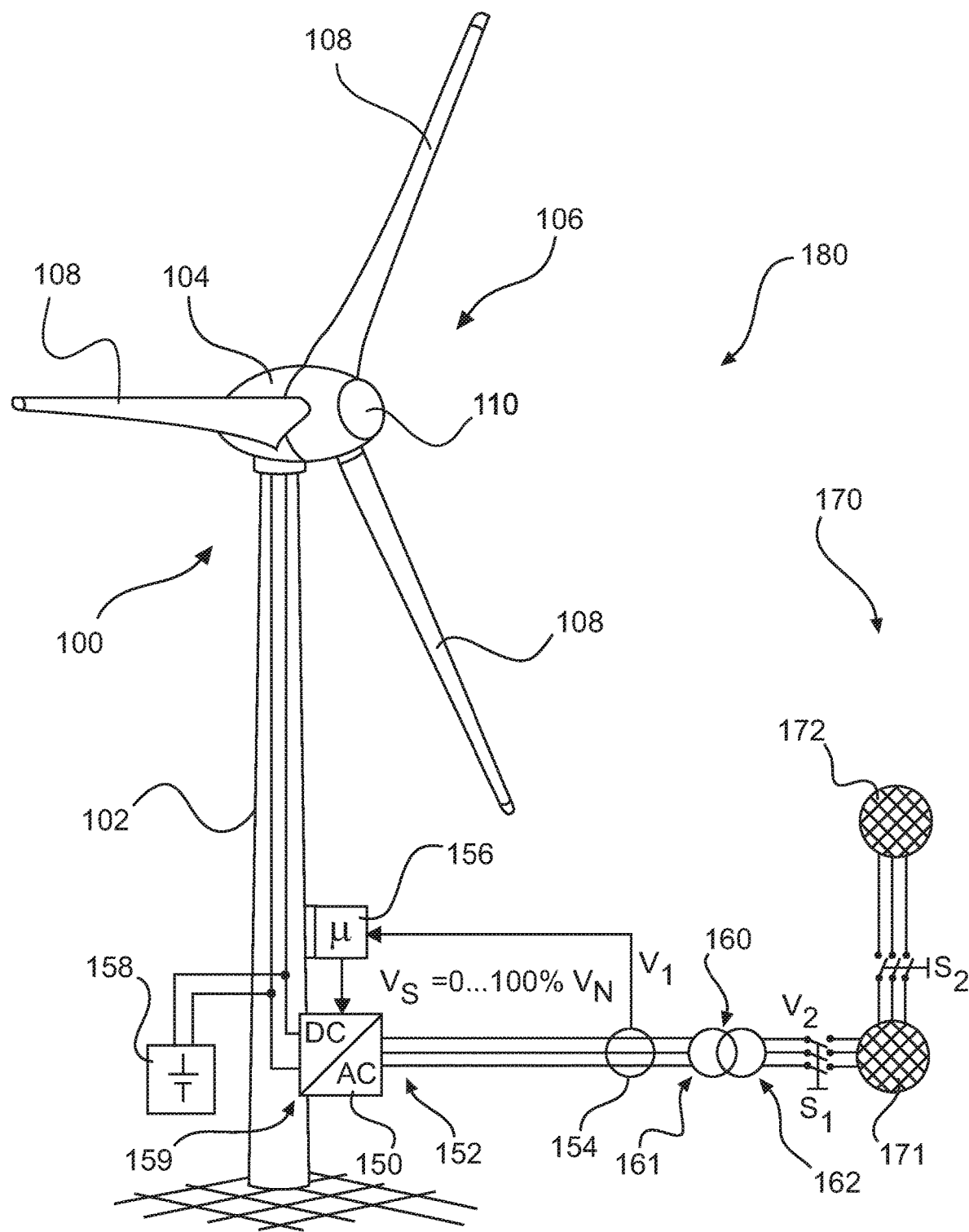
FIG. 1 shows a wind turbine system having a wind turbine connected to an electrical grid in a schematic view and partially in a perspective view.

FIG. 1 shows a wind turbine 100 having a tower 102 and a nacelle 104. At the nacelle 104 there is a rotor 106 having three rotor blades 108 and a spinner 110. The rotor 106 is rotated during operation by means of the wind and thereby drives a generator which is located inside the nacelle 104.

This way electrical energy is generated and provided as a DC current to the inverter 150. The inverter 150 having an inverter output 152 being connected to a primary side 161 of a transformer 160. The inverter 150 is capable of adjusting its output voltage $V_1$ at its inverter output 152. This way the output voltage $V_1$ of the inverter output 152 which is supplied to the primary side 161 of the transformer 160 can gradually be increased from 0% or 5% according to another embodiment, to 100% of a nominal value or close to the nominal value of such output voltage.

For operating such method the output voltage $V_1$ is measured by means of a voltage sensor 154 and provided as a sensor signal to a control unit 156. The control unit 156 thus controls the inverter 150. For increasing the output voltage $V_1$ of the inverter 150 the control unit 156 provides a set value $V_S$ for the output voltage $V_1$. This set point voltage $V_S$ can also gradually be increased from 0 to 100% with respect to a nominal voltage $V_N$. The control unit 156 can also provide further control signals as known by the person skilled in the art. A storage device 158 is provided, being connected to the inverter 150 at a DC-input 159. The storage device 158 delivers energy to the inverter 150 for increasing the output voltage $V_1$.

However, the output voltage $U_1$ and thus the set point voltage $V_S$ can also be increased stepwise. If such steps are small enough, that can be similar to gradually increasing the voltage.

By gradually increasing the output voltage $V_1$, the voltage at the primary side 161 of the transformer 160 is increased, as these are the same voltages. Accordingly, the output voltage $V_1$ at the inverter output 152 can also be depicted as the primary voltage $V_1$ of the primary side 161 of the transformer 160. By increasing the primary voltage $V_1$ at the primary side 161 of the transformer 160, there is also an increase of a secondary voltage $V_2$ at the secondary side 162 of the transformer 160. Accordingly, the inverter 150 can gradually or in a different way increase the secondary voltage $V_2$ which is supplied to the electrical grid 170. In the embodiment shown in FIG. 1, the electrical grid 170 comprises at least a first part 171 and a second part 172. This first and second part 171, 172 can be separated or connected by means of a second switch $S_2$. The transformer 160 can be connected to the first part 171 by means of a first switch $S_1$.

The wind turbine 100 including the inverter 150 and the control unit 156 forms a wind turbine system 180, including the transformer 160.

Figure 2:
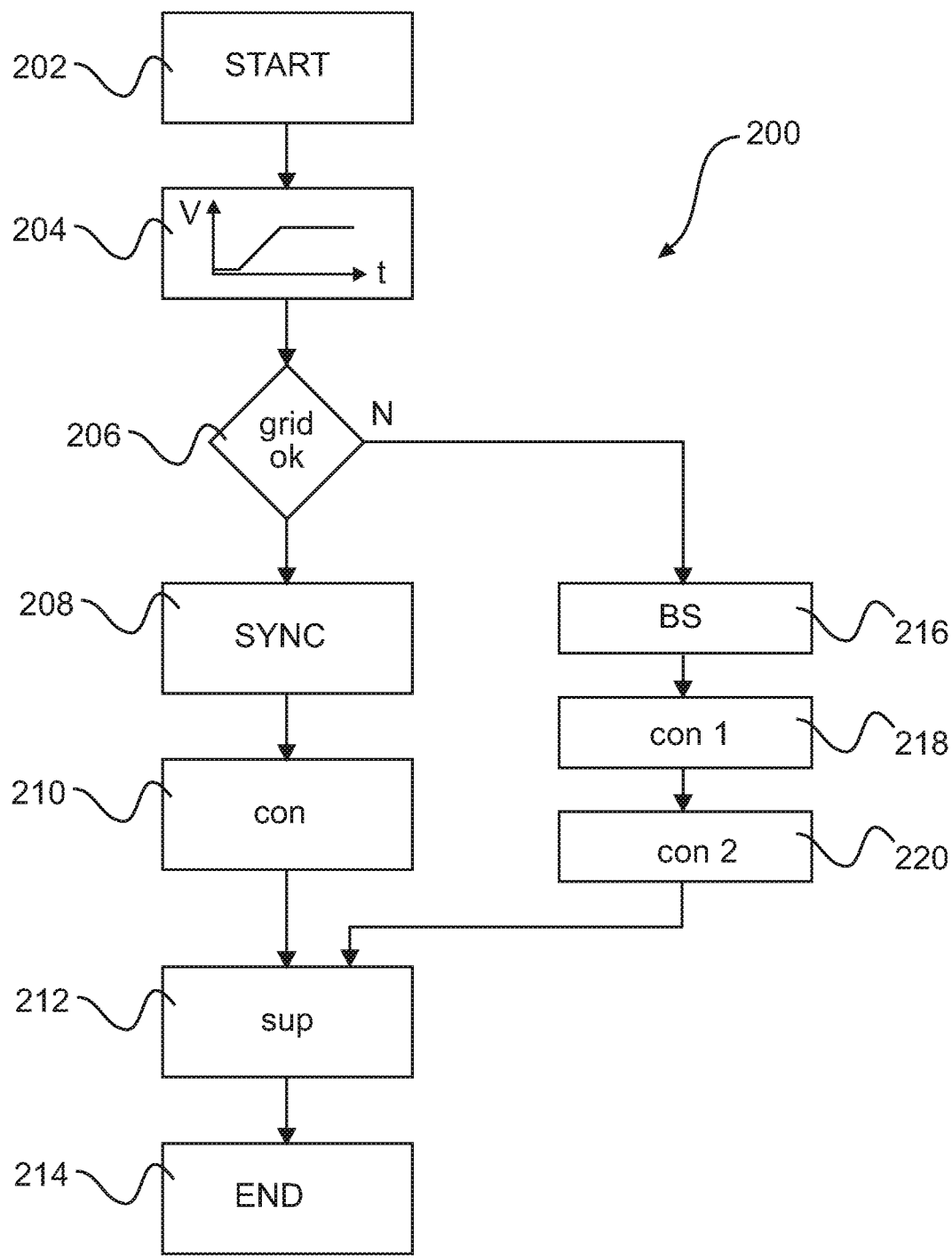
FIG. 2 shows a flow chart of a method for connecting a power transformer according to one embodiment.

FIG. 2 shows a flow chart describing a method for connecting a power transformer to the electrical grid according to one embodiment. According to this flow chart 200 the method starts at a start block 202. The method is started when the power transformer, such as the power transformer 160 according to FIG. 1, is not connected to the electrical grid and is not powered by any voltage.

As part of the start block 202 it could be checked whether the transformer is disconnected from the grid. This could in particular mean that it is checked whether according to FIG. 1 transformer 160 is separated from the first part 171 of the grid 170 by means of the first switch $S_1$. If such starting conditions are met the voltage can be increased according to the increase block 204. Accordingly, the increase block 204 is illustrated by a time dependent increase of the voltage. Such increase can be done by increasing the voltage von 0% to 100% of a nominal voltage using a corresponding increase ramp which defines a slope linearly and continuously increasing the voltage over time. However, other kinds increasing the voltage can also be implemented. One possibility is to start at a low voltage value such as 5% of the nominal voltage. In addition or alternatively it might be suggested that the voltage does not exactly reach 100% of a nominal value, but a slightly smaller or slightly larger value. Many other strategies could be use such as increasing the voltage by small steps.

Once the increase process according to the increase block 204 is fulfilled, i.e., once the final voltage, in particular the nominal voltage, is reached, the process goes on with examining whether the grid, in particular the first part 171 of the grid 170 according to FIG. 1 is available or not. This is done according to the examination block 206. Whether the grid is available or not particularly means whether there is a stable voltage in said grid or if there is no grid available. If there is no grid available this includes a situation according to FIG. 1 when the second switch $S_2$ is open and the first part 171 of the grid 170 is not available, i.e., having a voltage level of zero volts. If such second switch $S_2$ is open the examination block 206 does not need to examine whether the second part 172 of the grid 170 is available.

Depending on the result of the examination according to the examination block 206 different predefined target conditions will be checked or prepared.

Accordingly, if the grid is available the examination block 206 will branched to the synchronization block 208. According to the synchronization block 208 voltage frequency and phase of the voltage in the grid, in particular the voltage in the first part 171 of the grid 170 according to FIG. 1, will be measured continuously. Based on such measurement the wind turbine, in particular the inverter which has increased the voltage according to the increased block 204, will adapt its voltage output at the inverter output 152 of the inverter 150 according to FIG. 1. According to that the output voltage $V_1$ will be adjusted such that the secondary voltage $V_2$ at the secondary side 162 of the transformer 160 matches to a voltage in the first part 171 of the grid 170 with respect to voltage level, frequency of the voltage and phase of the voltage.

If all the synchronization has been done successfully the method goes on from the synchronization block 208 to the connection block 210. According to the connection block 210 there will basically a switch being closed, such as the first switch $S_1$ according to the embodiment explained in FIG. 1.

After connection according to the connection block 210 the method proceeds to grid support according to the support block 212. Such support particularly includes feeding active and reactive power particularly depending on the state of the grid and/or a requirement by the grid operator operating the corresponding grid. In particular, the support block 212 provides for feeding active power depending on the frequency in the grid and feeding reactive power depending on the voltage level in the grid.

Finally, the method ends in the end block 214 if the grid and the feeding into the grid by means of the inverter operates in a basically regular and stable way. Thus, the end of the proposed method means, that after that the wind turbine continuous feeding power into the grid in a regular way.

If in the examination block 206 it was realized that the grid is not available the examination block 206 branches to the black start block 216. According to the black start block 216 the voltage level is controlled to a nominal value. This may in particular mean that either the output voltage $V_1$ according to the embodiment of FIG. 1 is controlled to a nominal value of the output voltage $V_1$ and thus of the voltage at the primary side 161 of the transformer 160. It may also mean that the secondary voltage $V_2$ at the secondary side 162 of the transformer 160 is controlled to a value similar to a nominal value of the voltage of the grid, in particular of a nominal value of the voltage in the first part 171 of the grid 170.

In addition in the black start block 216 the frequency of the voltage is controlled to a nominal frequency. This is in particular 50 Hz or 60 Hz depending on the particular grid.

Once these values of the voltage amplitude and the frequency and phase of the voltage have been reached, the transformer can be connected to the grid or at least the separated part of the grid. In particular, according to the embodiment of FIG. 1 the first switch $S_1$ can be closed, this way connecting the transformer 160 and thus the inverter 150 and thus the wind turbine 100 to the first part 171 of the grid 170. It may however also be checked before that whether this first part 171 of the grid 170 is ready to receive a voltage, i.e., a nominal voltage when connecting the first switch $S_1$. This may include to check whether consumers are disconnected or at least only few consumers are connected to this first grid part 171. It may also include to check that there is no grid failure such as a short circuit. All this is done according to the first step connection block 218.

After the transformer 160 and thus wind turbine 100 are connected to the first grid part 171 and thereby providing a nominal voltage value to this first grid part 171 the grid part 171 is thus basically started or restarted. Further steps can then be fulfilled such as connecting first or further consumers to the first grid part 171 and concurrently increasing the power fed into the this first grid part 171 by means of the wind turbine 100. This may include that the wind turbine 100 further connects or powers further inverters which may particularly be connected in parallel to the inverter output 152 according to the first embodiment illustrated in FIG. 1.

If the first grid part 171 is thus further brought into a basically normal operating condition, the wind turbine and thus the inverter 150 may as well support the first grid part 171 similar to the options described with respect to the support block 212. However, such support of the first grid part 171 will be different as this first grid part 171 is just a small part of a grid 170 and thus may react differently when compared to a large grid. Steps similar to the support block 212 maybe adapt to the particular characteristics of such first grid part, in particular of the first grid part 171 according to the embodiment shown in FIG. 1.

Once this first grid part operates basically properly, it may be reconnected to a further part of the grid or to the rest of grid. According to the embodiment shown in FIG. 1 it may be reconnected to the second grid part 172 by closing the second switch $S_2$. This is done according to the second step connection block 220.

Of course, before the second switch $S_2$ is closed it must also be taken care of that the first and second grid parts 171 and 172 are synchronized. Such synchronization is basically similar to the synchronization explained with respect to the synchronization block 208. However, there are of course differences as for reconnecting the first and second grid part 171, 172 the inverter 150 needs to synchronize the complete first grid part 171. A further difference may be that after closing the first switch $S_1$ but before closing the second switch $S_2$ further inverters could be involved in addition to the inverter 150. Accordingly, all these inverters then need to take care for the synchronization. It may also be that in the meantime further energy producers have been connected to the first grid part 171 and thus all these generating units together need to take care for the synchronization. However, the inverter 150 may lead such synchronization. It may also be that alternatively or in addition the second grid part 172 is synchronized to the first grid part 171.

After such reconnection according to the second step connection block 220 the whole grid, in particular the whole grid 170, may be supported as explained with respect to support block 212. As support may in general be similar, this is illustrated by the flow chart 200 continuing from the second step connection block 220 to the support block 212.

Figure 3:
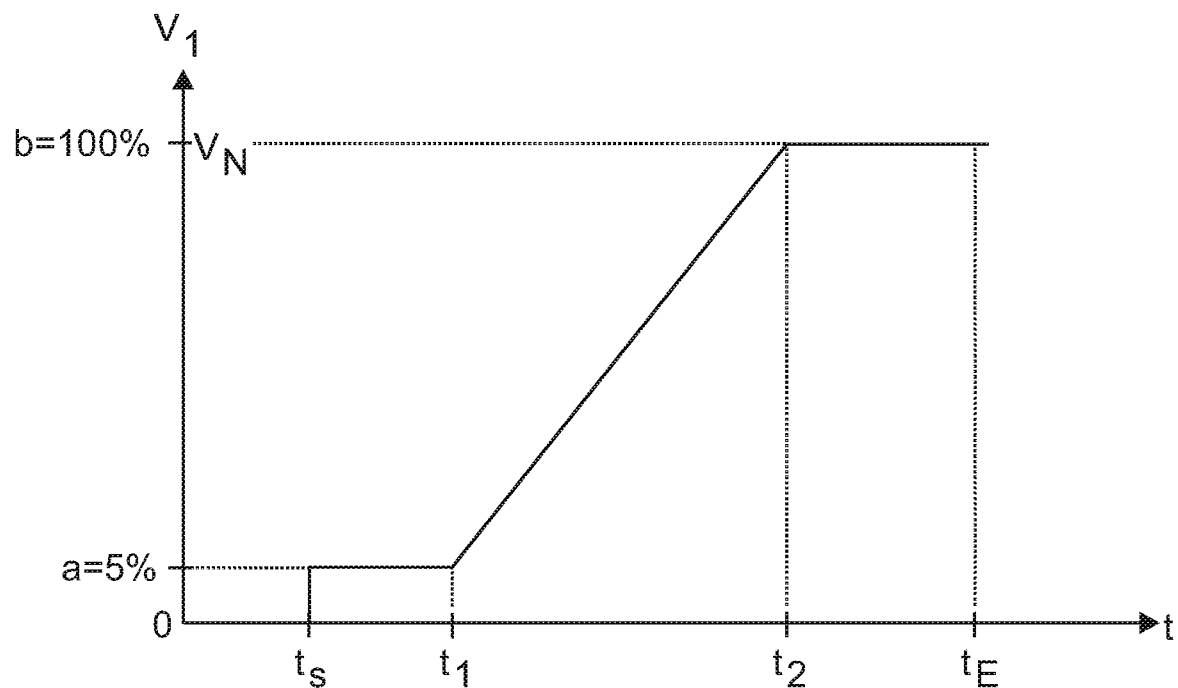
FIG. 3 shows a diagram of a voltage value over time as part of a method for connecting a power transformer according to one embodiment.

FIG. 3 shows a diagram of the output voltage $V_1$ which can be the output voltage $V_1$ according to the embodiment shown in FIG. 1. Accordingly FIG. 3 shows a diagram for the primary voltage $V_1$ at the primary side 161 of the transformer 160. However, instead the secondary voltage $V_2$ at the secondary side 162 of the transformer 160 could be used as well but will of course have a higher voltage level.

Accordingly, the diagram shows some steps of time t. At the beginning it is assumed that a transformer, in particular the transformer 160, is not powered and thus the primary voltage $V_1$ is 0. Then a start process starts, such as according to the start block 202 shown in FIG. 2. At that time the voltage may be kept at the level of 0 volts but according to another embodiment the voltage may be increased to a small value such as 5% of a nominal value. This embodiment is shown in FIG. 3. This small value of 5% is generalized by the variable a, representing a low start voltage.

After the starting process is basically fulfilled the method can continue with increasing the voltage gradually starting at the first point in time $t_1$. Beginning from there with a small value of a, i.e., 5%, the voltage is increased linearly to the final voltage level of 100%. This final voltage value is generalized with the variable b, representing the target voltage and this value could thus also be slightly different to 100%, e.g., 105% or 95%. However, this 100% of the nominal voltage value $V_N$ is preferred and the linear increase reaches this final value at the second point in time $t_2$.

The way of increasing the voltage from the first point of time $t_1$ to the second point of time $t_2$ with a linear function can be defined according to the formula given below the diagram in FIG. 3, namely the following formula:

$$V_1 = \cdot \left(a + \frac{b-a}{t_2-t_1}(t-t_1)\right)\bigg| t = [t_1 \ldots t_2]$$

Accordingly, this formula is only for the time section between the first point of time $t_1$ and the second point of time $t_2$. The value a represents a smallest value as a percentage of the nominal voltage and the variable b represents the largest value with respect to nominal voltage. $V_1$ represents the nominal voltage. The variable $V_1$ represents the primary voltage at the primary side of the transformer. In the same way the secondary voltage $V_2$ of the secondary side of the transformer can be defined by the same formula by exchanging $V_1$ by $V_2$, whereas in that case $V_N$ represents the nominal voltage with respect to the voltage in the grid.

Finally, at the point of time $t_2$ the voltage $V_1$ shall remain at this preferred level of 100% while the method examines the grid in a way explained with respect to the examination block 206 of FIG. 2 and also performs the following blocks of the flow chart 200 of FIG. 2, until the end block 214 is reached. This is identified in the diagram of FIG. 3 by the point of time $t_E$.

The invention claimed is:

1. A method for connecting a power transformer to an electrical grid, the power transformer being located between an inverter of a wind turbine and the electrical grid, the method comprising:
gradually increasing a first voltage at a primary side of the power transformer from a starting voltage to a target voltage, the starting voltage being less than the target voltage, the target voltage being equal to or close to a nominal voltage of the power transformer, wherein the gradually increasing the first voltage comprises using the inverter of the wind turbine, thereby increasing a second voltage at a secondary side of the power transformer, wherein the inverter supplies electrical power generated by the wind turbine to the electrical grid, wherein the gradually increasing of the first voltage uses energy of an internal energy storage device, and wherein the internal energy storage device is pre-charged from the wind turbine during normal operation of the wind turbine, and
connecting the secondary side of the power transformer to the electrical grid in response to predefined target conditions being reached.

2. The method according to claim 1, wherein:
gradually increasing the first voltage of the primary side of the transformer avoids or prevents an overload current of the inverter, and
the first voltage of the primary side is increased gradually to the target voltage over a predefined rising time.

3. The method according to claim 2, wherein gradually increasing the first voltage of the primary side of the power transformer avoids or reduces an inrush-current in the power transformer.

4. The method according to claim 2, wherein the predefined rising time is in a range of 10 milliseconds (ms) to 300 seconds.

5. The method according to claim 4, wherein the predefined rising time is in a range of 100 ms to 30 seconds.

6. The method according to claim 2, wherein the starting voltage is in a range of 0 to 70% of the nominal voltage of the power transformer.

7. The method according to claim 2, wherein the target voltage is in a range of 75% to 110% of the nominal voltage of the power transformer.

8. The method according to claim 7, wherein the target voltage is the nominal voltage of the power transformer.

9. The method according to claim 1, wherein:
the wind turbine is operated in a self-sustain mode once the target voltage has been reached and at least until the secondary side of the power transformer has been connected to the electrical grid.

10. The method according to claim 1, wherein:
if the electrical grid is in operation when connecting the secondary side of the power transformer to the electrical grid:
active power is readily consumed from the electrical grid or injected into the electrical grid once the secondary side of the power transformer is connected to the electrical grid, and/or
reactive power is readily consumed from the electrical grid or injected into the electrical grid once the secondary side of the power transformer is connected to the electrical grid, or
the wind turbine is connected to the electrical grid without consuming or injecting any power.

11. The method according to claim 1, wherein if the electrical grid is not in operation, the wind turbine operates the electrical grid or part of the electrical grid in an island mode after connecting the power transformer to the electrical grid.

12. The method according to claim 1, wherein:
if the electrical grid is separated into a first part and a second part and after connecting the secondary side of the power transformer to the electrical grid, the power transformer is connected to the first part,
the wind turbine operates the first part in an island mode,
the wind turbine synchronizes the first part of the electrical grid to the second part of the electrical grid to prepare a reconnection, and
a reconnection of the first part and the second part of the electrical grid is initiated after the first part and second part of the electrical grid are synchronized to rebuild the electrical grid or a part of the electrical grid.

13. The method according to claim 1, wherein the inverter is a voltage source inverter.

14. The method according to claim 1, wherein the energy storage device is not buffered from the electrical grid after a recovery of the electrical grid.

15. A wind turbine system, comprising:
a wind turbine having:
an inverter for supplying electrical power generated by the wind turbine to an electrical grid; and
an internal energy storage device for storing energy to supply to the inverter or an auxiliary inverter;
a power transformer located between the inverter of the wind turbine and the electrical grid, the power transformer having:
a primary side for connecting to the inverter; and
a secondary side for connecting to the electrical grid,
wherein the wind turbine system comprises a controller configured to:
gradually increase a voltage at the primary side of the power transformer from a starting voltage to a target voltage equal to or close to a nominal voltage of the power transformer by the inverter of the wind turbine or by the auxiliary inverter, thereby increasing the voltage at the secondary side of the power transformer, wherein the gradually increasing of the voltage uses energy from the internal energy storage device, wherein the starting voltage is less than the target voltage, and wherein the internal energy storage device is pre-charged from the wind turbine during normal operation of the wind turbine, and
connect the secondary side of the power transformer to the electrical grid after predefined target conditions being reached.

16. The wind turbine system according to claim 15, wherein at least one of: the inverter or the auxiliary inverter is provided as a voltage source inverter.

17. The wind turbine system according to claim 15, wherein the wind turbine comprises the controller.

18. A wind turbine, comprising:
an inverter for supplying electrical power generated by the wind turbine to an electrical grid; and
an internal energy storage device for storing energy to supply the inverter or an auxiliary inverter, being configured to be connected to:
a power transformer located between the inverter of the wind turbine and the electrical grid, the power transformer having:
a primary side for connecting to the inverter; and
a secondary side for connecting to the electrical grid,
wherein the wind turbine comprises controller configured to:
gradually increase a voltage at the primary side of the power transformer from a starting voltage to a target voltage equal to or close to a nominal voltage of the power transformer by the inverter of the wind turbine or by the auxiliary inverter, thereby increasing the voltage at the secondary side of the power transformer, wherein the starting voltage is less than the target voltage, wherein the gradually increasing of the voltage uses energy of the internal energy storage device, and wherein the internal energy storage device is pre-charged from the wind turbine during normal operation of the wind turbine, and
connect the secondary side of the power transformer to the electrical grid after predefined target conditions being reached.

19. The wind turbine according to claim 18, wherein at least one of: the inverter or the auxiliary inverter is a voltage source inverter.

* * * * *